Nov. 22, 1966   S. B. WILLIAMS ETAL   3,286,372
INSTRUCTIONAL AND TESTING DEVICE
Filed May 1, 1963   6 Sheets-Sheet 1

INVENTORS.
Sam B. Williams
John F. Jones
Lawrence P. Kazyak
BY Harness, Dickey & Pierce
ATTORNEYS

United States Patent Office 3,286,372
Patented Nov. 22, 1966

3,286,372
INSTRUCTIONAL AND TESTING DEVICE
Sam B. Williams, Walled Lake, John F. Jones, Berkley, and Lawrence P. Kazyak, Detroit, Mich., assignors to Williams Research Corporation, Walled Lake, Mich., a corporation of Michigan
Filed May 1, 1963, Ser. No. 277,171
37 Claims. (Cl. 35—9)

This invention relates to instructional devices, and more particularly to apparatus for providing both instruction and testing of a recorded nature for individual students.

It is an object of the invention to provide a novel and improved instructional apparatus which enables an individual student to control the rate at which instruction is imparted, and by means of which the student may be tested at intervals with the test answers automatically recorded and information concerning the correct answer given to the student.

It is another object to provide an improved instructional apparatus of this nature which permits testing to be done either by posing written questions to the student or by verbal questioning, with a common answer recording system being usable with both types of questions.

It is also an object to provide an improved instructional apparatus having the above characteristics, in which either a limited or an unlimited amount of time may be allotted for answering each question without requiring any alteration in the construction.

It is a further object to provide an improved instructional apparatus of the above character which minimizes the cheating possibilities when recording test results, and in which an identification code may be applied to the test record by the same means used to record the test results.

Other objects, features and advantages of the present invention will become apparent from the subsequent description, taken in conjunction with the accompanying drawings.

In the drawings:

FIGURE 1 is a perspective view of the instructional desk showing the general arrangement of the viewing screen, test record tape and controls;

In general terms, the illustrated embodiment of the invention comprises a desk having a forward writing portion and a hood at the central portion which surrounds a translucent viewing screen, a loudspeaker, and the exposed portion of a test record tape, as well as a control bank. The rear portion of the desk carries a cover surrounding most of the components of the unit including a sound motion picture projector together with relays, switches and other apparatus for coordinating the various signals carried on the film with the test selector switches and test record tape.

The film used in the projector may be standard sound motion picture film, but when carrying out the purposes of the invention a specially prepared film is used carrying coded signals at the four corners of each frame in the form of black or transparent areas.

The special film may carry any appropriate type of lecture or demonstration, and is used to present two different types of tests to a student seated at the desk during the course of running of the film. A first type is an unlimited time test, usually a written question test of a multiple choice type, in which several possible answers to a question are visually displayed. The projector stops automatically when each written question and possible answers are displayed, and the student is permitted an unlimited amount of time to select his answer. In the illustrated embodiment, four answer buttons are provided, and a test record tape will be punched "correct" or "incorrect," depending upon the student's choice of an answer. When he depresses an answer button, a light will be visible to the student opposite the button corresponding to the correct answer, so that the student may refer back to the correct answer still visible on the screen. When the student releases his answer button selection, the projector will automatically restart.

The second type of test is a limited time test, usually a verbal question asked by the lecturer during the course of running of the film, this question being of a true-false type. The student must answer this question by depressing the true or false button within a given time, this time being determined by the number of frames to which the coding is applied. If he does not answer within the allotted time, the tape is punched incorrect. The projector continues to run during and after a verbal question.

Means are provided for permitting the student to reverse the portion at any time in order to review a portion of the lesson. When the film is reversed and then restarted in a forward direction, an appropriate mark is made on the test record tape so that the student's test record may be accurately read, and cheating by rerunning an easy question avoided. The film coding may also be used to mark the tape with a designation corresponding to the particular film so that the test may be properly identified.

Referring more particularly to the drawings, the instructional desk is generally indicated at 11 in FIGURE 1 and comprises an upright support 12, a forward desk or writing portion 13, a control panel 14 at the rear of desk 13, a hood 15, and a cover 16 contiguous with and extending rearwardly from hood 15.

A translucent screen 17 of rectangular shape is mounted in a wall 18 which is surrounded by hood 15, and a loud-speaker cover 19 is mounted on wall 18 alongside screen 17. A slot 21 is formed in the upper portion of loud-speaker cover 19, and a test record tape 22 is fed outwardly from slot 21 during the course of operation of the device. Tape 22 has the word "correct" printed intermittently along one margin, and the word "incorrect" printed along the other margin. As the student selects an answer to each question, holes 23 indicating a correct answer, or holes 24 indicating an incorrect answer, will be punched in tape 22 in two lines adjacent the respective "correct" or "incorrect" printing. The finished test record tape strip may be torn off at slot 21 and marked with the student's name and date.

Control panel 14 has four answer buttons 25, 26, 27 and 28 on the left-hand side, four correct answer signal lamps 29 above them, and a master on-off button 30, a volume control 31 and a projector motor control button 32 on the right-hand side. Buttons 25 to 28 are marked "1," "2," "3," and "4" respectively, and buttons 25 and 26 are also marked "True" and "False" respectively.

Figure 2:
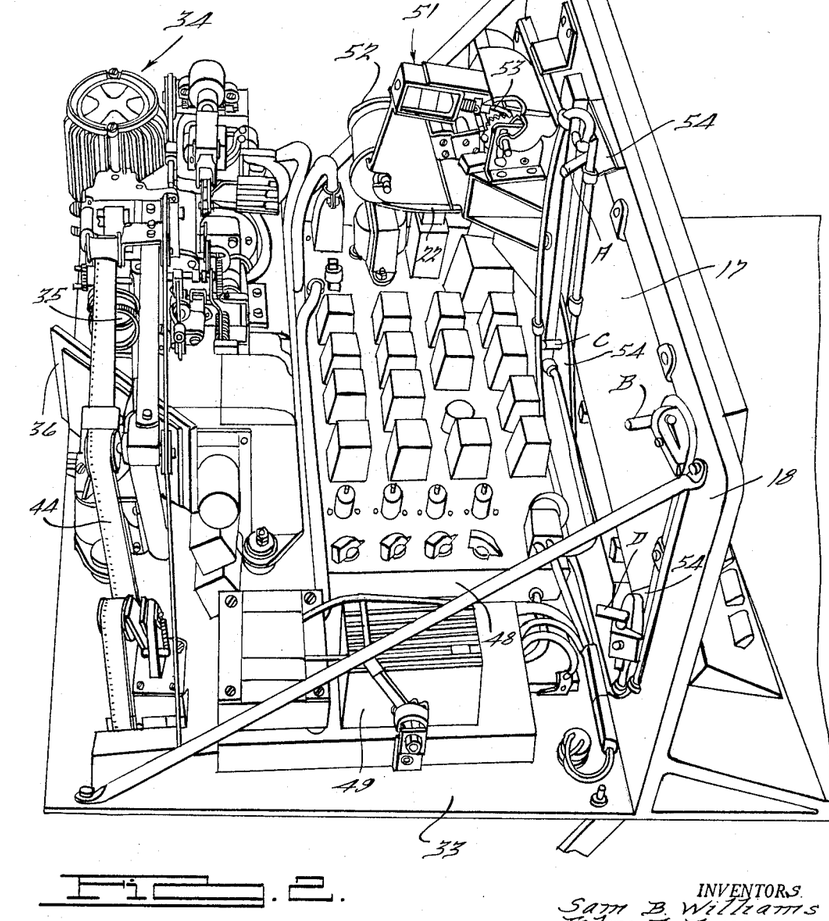
FIG. 2 is a side perspective view of the chassis with the cover removed and showing the location of various components of the assembly.
Figure 3:
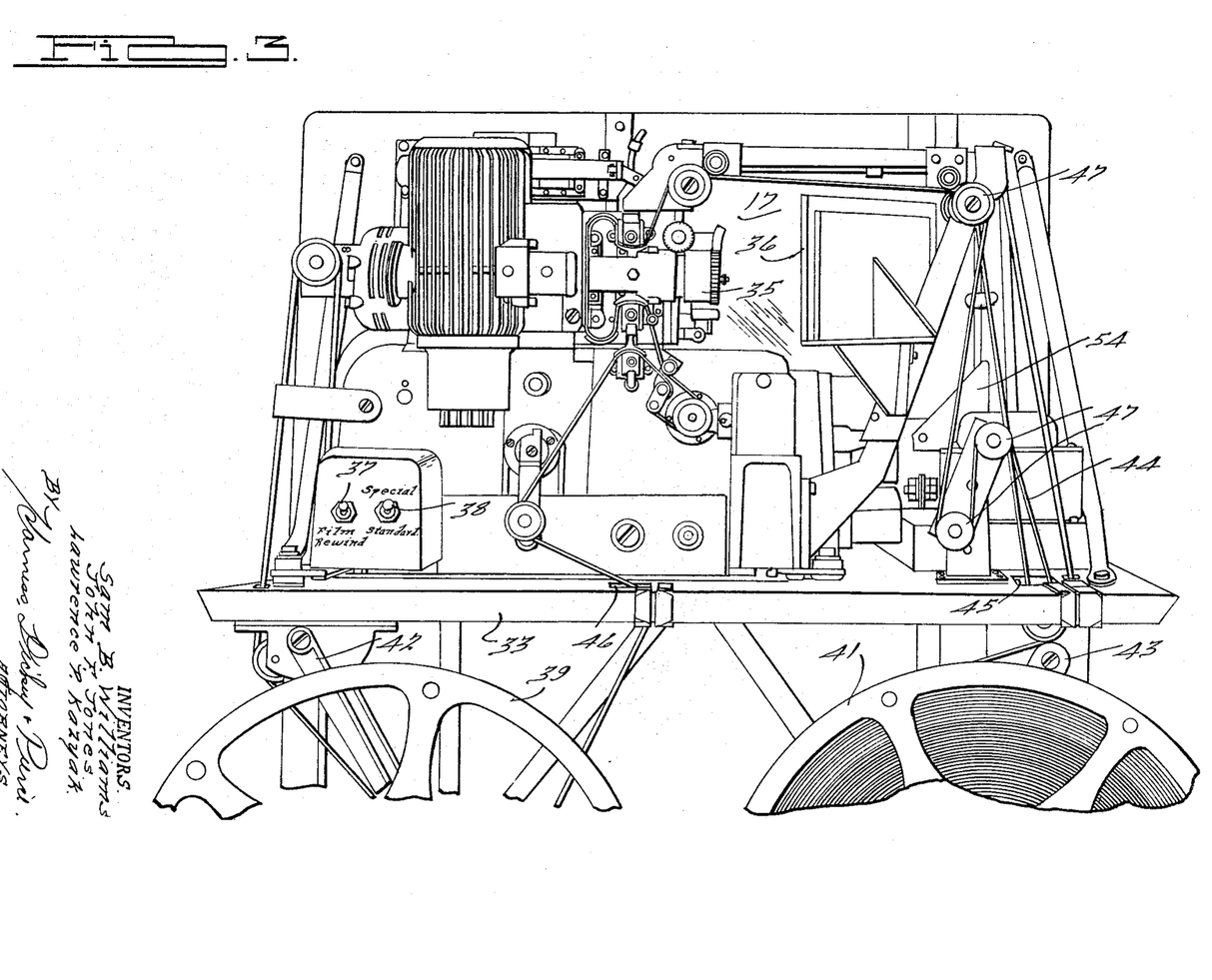
FIG. 3 is a rear perspective view of the chassis with the cover removed, showing the reel positions as well as the projector and mirror arrangements.

As seen in FIGURES 2 and 3, a base 33 extends rearwardly from the lower edge of wall 18, and a motion picture projector generally indicated at 34 is mounted adjacent the rear edge of base 33, the lens 35 of the projector being directly laterally toward a mirror 36 mounted at a 45° angle so as to reflect the projected image onto screen 17. Projector 34 may be of a conventional sound type, and is provided with a film rewind switch 37 and a "special-standard" switch 38 for setting the circuitry in accordance with the type of film being used so that the intelligence section of the unit may be disenabled when standard film without coding is being projected.

A pair of reels 39 and 41 are mountable on arms 42 and 43 respectively, these arms being supported below the rear edge of base 33, and the film 44 travels above the base through apertured portions 45 and 46 and around various sprockets and rollers 47.

An electronic chassis 48 is mounted on base 33 between projector 34 and wall 18, this chassis carrying various relays, electronic tubes and other components. A transformer 49 is mounted on base 33 alongside chassis 48. A tape feeding and punching assembly generally indicated at 51 is secured to wall 18 in back of speaker screen 19, this assembly carrying a roll 52 with tape 22 adapted to be fed through slot 21 by a solenoid-operated pawl and ratchet mechanism 53.

The four corners of translucent screen 17 are masked by triangular pieces indicated at 54 in FIGURE 2 so as to prevent light from mirror 36 from striking these corners. Four photoelectric cells indicated at A, B, C and D are mounted immediately rearwardly of masks 54 and are adapted to receive light emitted from the corresponding four corners of mirror 36 as received from film 44. In the uncoded portions of the film, these corners are made black in each frame, but when actuation of a relay or relays is required, the corresponding frame corners are either punched out or printed as transparent spots on the film.

Figure 5:
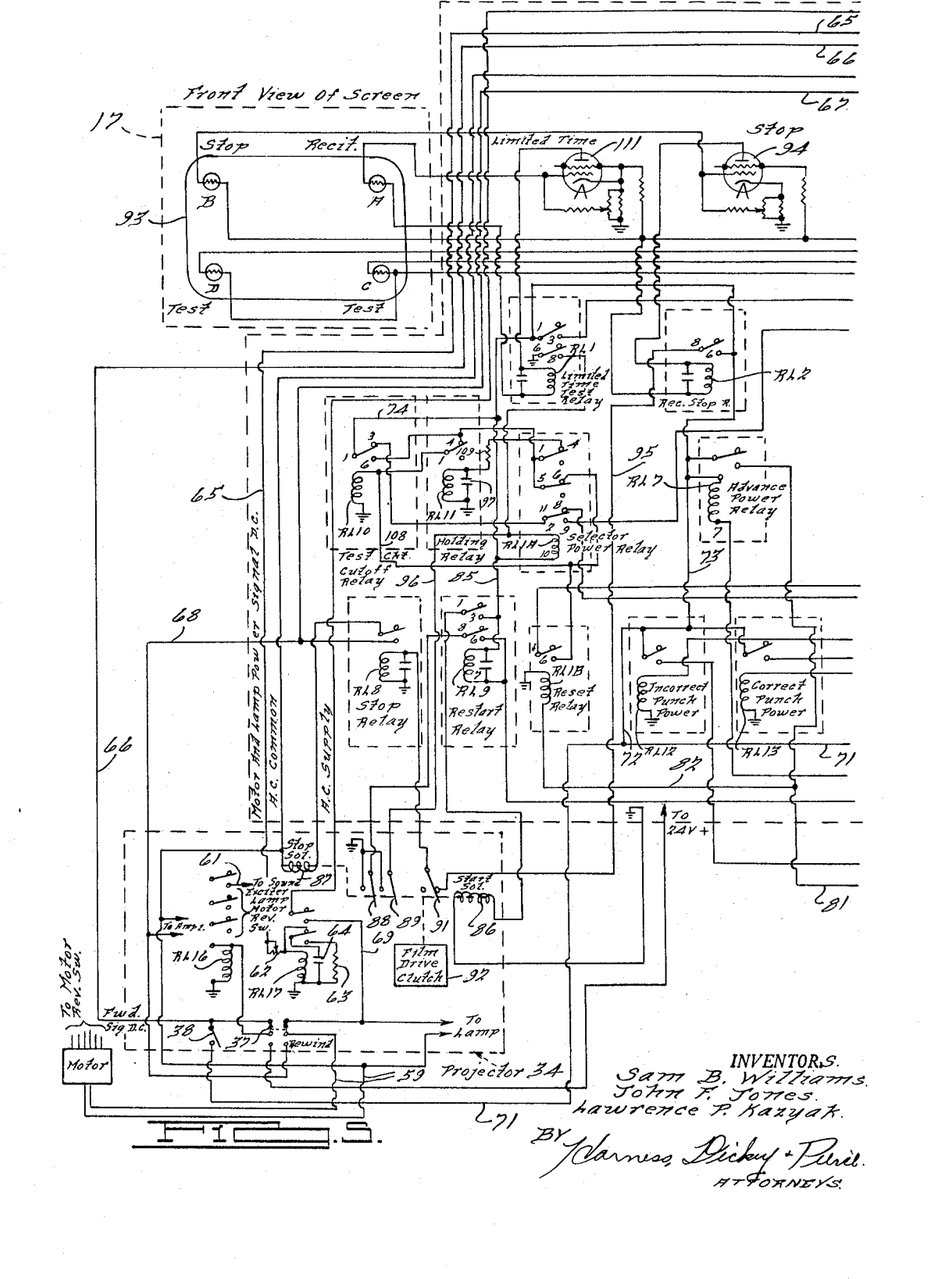
FIG. 5 is a portion of an electrical circuit diagram of the unit.

FIGURE 5 shows schematically a front view of screen 17 together with photoelectric cells A, B, C and D. Energization of cell B is used to trip the stop mechanism for the projector when an unlimited time test question is posed, and the four possible dark and light combinations for cells C and D are used for the multiple choice answer coding. The presence of a series of light upper right-hand corners on the film frames after a limited time question has been posed energizes photocell A and sets a latching circuit while the film continues to run. This circuit is arranged to produce an incorrect mark on tape 22 when the upper right-hand film corner is no longer light unless the latching circuit has been previously de-energized by a signal indicating that the student has answered. The last-mentioned signal also causes the answer circuits to be disenabled, preventing more than one answer from being recorded. With the circuitry as shown, only two answer choices, usually true or false, are available under the limited time coding.

A combination of signals from photocells A and D is used to record an identification code on the tape corresponding to the particular film being used. Photocell D is not used in conjunction with the limited time test coding, so that it will be available for identification coding. When short sections of coding from photocell A are applied and removed, incorrect punches will appear on the tape. If these are combined with light lower left-hand corners, energizing photocell D, correct punches will result. A combination of incorrect and correct punches may be used as an identification code; for example, five correct punches, followed by three incorrect punches and six correct punches would indicate the code number 536, identifying the film with which the particular test record tape was used.

If desired, the circuitry could be altered to provide four answer choices for limited time test questions, by eliminating the identification coding.

Figure 6:
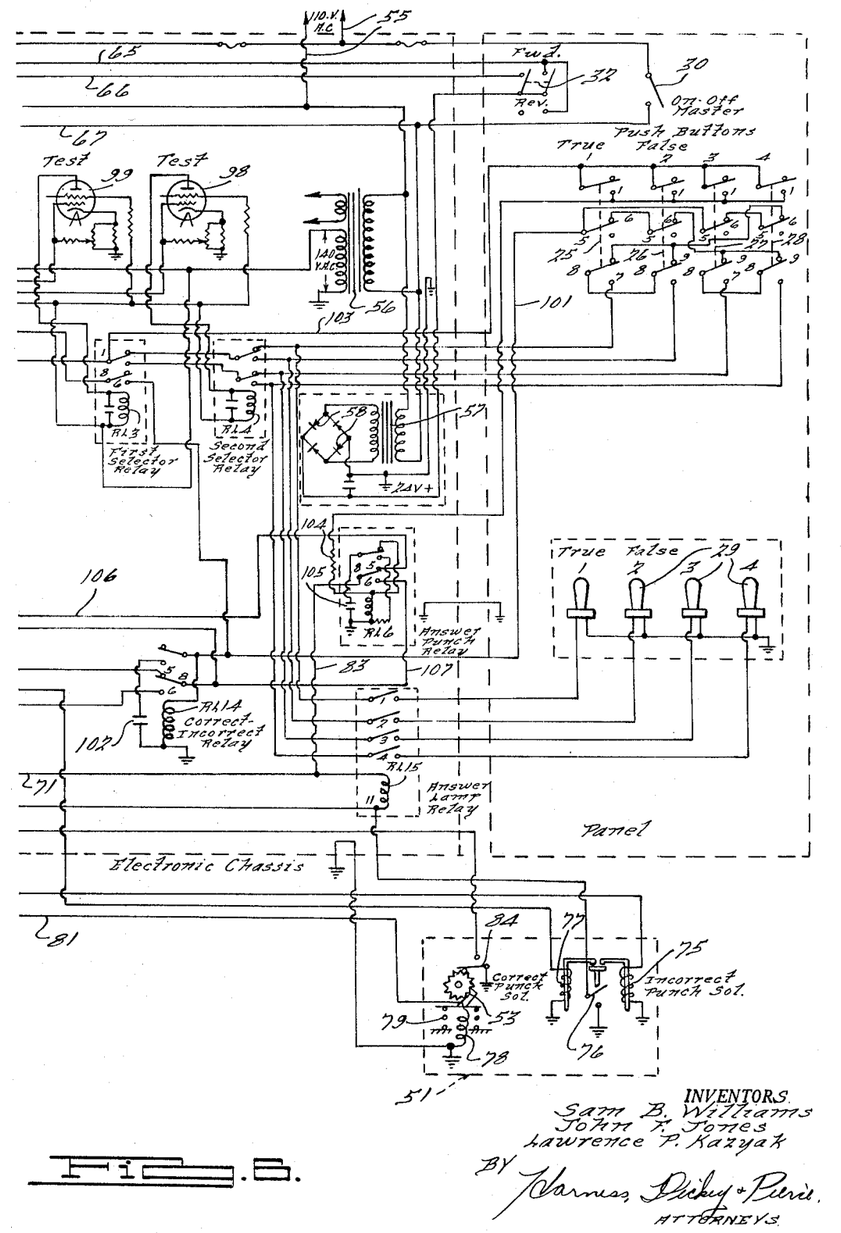
FIG. 6 is a second portion of the electrical circuit diagram to be read in conjunction with FIG. 5 by placing it to the right thereof.

Power is supplied to the unit by a 110 volt A.C. line indicated at 55 in FIGURE 6, 140 volts A.C. being supplied to the photocells and the thyratrons which they operate through a transformer 56. The relay circuits are generally operated from a 24 volt D.C. line supplied by a transformer 57 and using a selenium rectifier 58 for quietness; some solenoids are operated directly from the 110 volt supply.

The motor of projector 34 is controlled by switch 32. switch, visible in FIGURE 6, is a double-pole double-throw switch and controls both off-on and direction of rotation of the motor. One pole of switch 32 is used to apply 24 volt D.C. power to a lamp and motor off-on relay RL17, the lines supplying the motor being indicated at 59 in the lower portion of FIGURE 5. The other pole of switch 29 is used to apply 24 volt D.C. power to a forward-reverse relay RL16 during forward operation only. This latter 24 volt D.C. power is also fed through "special-standard" switch 38 to the intelligence section of the device, the latter section thus being disabled when the projector motor is reversed. A sound exciter lamp connection 61 is also disconnected by RL16 when the motor is reversed to provide silence during reverse movement. Resistors 62 and 63 and a capacitor 64 are connected with RL17 to provide a time delay reducing the strain on the motor during quick forward-reverse shifting.

As described in further detail below, the film stoppage for unlimited time-test questions is accomplished by a clutch mechanism in projector 34 so that the motor and cooling fan continue to run.

The remaining portions of the circuit may perhaps best be described by reviewing the operational sequence of the unit. Upon closure of switch 29 and with switch 32 in its forward position, 24 volt D.C. power will be supplied by transformer 57 to switch 32, causing energization of RL17 through wire 65 and of RL16 through wire 66. 110 A.C. power will also be supplied to the projector amplifier from switch 30 through wires 67 and 68. Energization of RL17 will supply power to the projector lamp through wire 69 and to the projector motor through this wire, rewind switch 37 and wires 59. Energization of RL16 will energize the sound exciter lamp and the projector motor in a forward direction.

When power is first applied to the circuit and the motor has started forward, 24 volt D.C. is supplied to pin 1 of a test circuit cut-off relay RL10, seen in FIGURE 5, through the following circuit: From switch 32 to wire 66, switch 38, and wires 71, 72, 73 and 74. Current will travel through pin 3 of RL10 to pin 11 of a selector power RL1A, and from the normally closed pin 8 of RL1A to pin 8 of a correct-incorrect relay RL14. The current will travel through normally closed pin 5 of RL14 to an incorrect punch power relay RL12. This in turn will close the relay switch of RL12, feeding power from line 72 to an incorrect punch solenoid 75.

This will cause an incorrect punch to be marked in tape 22, and completion of the punch stroke will ground pin 11 of an answer lamp relay RL15 and pin 7 of an advance power relay RL7. This grounding is accomplished by a switch 76 which is closed by downward movement of either the incorrect punch solenoid 75 or the correct punch solenoid 77, seen schematically in FIGURE 6.

RL15 controls the circuits of correct answer lamps 29 which do not pertain to the operation at this point. Energization of RL7 will cause the paper tape advance solenoid, indicated at 78 in FIGURE 6, to cock the advance spring 79 by supplying power from wire 73 to wire 81. Power will also be applied to reset relay RL1B through wire 82. Since pin 1 of RL1B is receiving power through the normally closed connection between pins 5 and 8 of answer punch relay RL6, the power being supplied from wire 71 through a wire 83, energization of RL1B will cause power to be applied to test circuit cut-off relay RL10.

Energization of RL10 will cause it to be locked in through its normally open contacts 1 and 6 and the normally colsed contacts 5 and 6 RL1A. A holding relay RL11 will in turn be energized when RL10 is energized, the current flowing from pin 6 of RL10 through normally closed pins 1 and 4 of RL1A.

This action will cut off the power to the incorrect punch power relay RL12 supplied through pins 1 and 3 of RL10, pins 11 and 8 of RL1A, and pins 8 and 5 of relay RL14, since the connection between pins 1 and 3 of RL10 will be opened. This in turn will permit the incorrect punch to retract and will break the ground circuit of RL7 by opening switch 76, causing RL7 to become de-energized and opening the circuit to spring cocking solenoid 78. This will permit advance spring 79 to cause pawl and ratchet mechanism 53 to advance the tape.

De-energization of RL7 also interrupts the power supply to RL1B which will disconnect RL10 from this source of power. RL10 will be held in its energized position, however, by its latching circuit.

When the tape advances, a switch 84 will be momentarily closed as shown in FIGURE 6 by virtue of the advancing ratchet movement, and this will serve to ground pin 7 of restart relay RL9, thus energizing this relay because of its connection to D.C. supply line 73 through a wire 85. Energization of RL9 will close its pins 1 and 3, connecting line 85 to a start solenoid 86.

Solenoid 86, as well as a stop solenoid 87, are connected to a bank of toggle switches 88, 89 and 91 in such manner that the three switches will move overcenter upon alternate energization of these two solenoids. The two solenoids 86 and 87 are also connected to a film drive clutch 92 shown schematically in FIGURE 5. At the start of operation, switches 88 and 89 will be closed, switch 91 will be open and the film drive clutch 92 will be disengaged, so that the projector motor will rotate without moving the film. However, when start solenoid 86 is energized, it will serve to engage clutch 92 and as the clutch becomes engaged, switches 88 and 89 will open and switch 91 will close.

Switch 88 when in its closed position, along with pins 8 and 6 of RL9, will form a holding circuit for RL9 so that this relay, and thus start solenoid 86, will remain energized until clutch 92 has been engaged. As the film is started by engagement of the clutch, RL9 will be de-energized by opening of switch 88, switch 84 having been previously opened by continued movement of pawl and ratchet 53.

The result of the above described sequence of operations will be to create an incorrect punch mark on the tape and to lock in RL10 and RL11. When these functions have been accomplished, the circuit will be ready to test the student. Locking in of the two relays is important, as will later appear. RL10 and RL11, in addition to RL1A, serve to punch an incorrect mark on the tape at the end of a limited time test question, and also prevent more than one answer from being received for each such question.

Let us assume that after the film has run for a while with a lecture, demonstration or other type of instruction being presented to the student, a written test sequence of the unlimited time type is to be carried out. At the desired point, the film will have a frame, indicated schematically at 93, in FIGURE 5, in which the upper left-hand corner, as viewed from the front of the screen, will be transparent. The light falling on photocell B when this frame arrives into projected position will cause a thyratron 94 to fire, energizing a sensitive recitation stop relay RL2. Closure of pins 8 and 6 of this relay will connect D.C. supply wire 73 through a wire 95 to closed switch 91 and thence to stop relay RL8. Energization of RL8 will in turn apply 110 volt A.C. to stop solenoid 87, the capacitor across the coil of RL8 insuring that this relay will remain closed long enough to complete the cycle. As mentioned previously, clutch 92 as well as switches 87, 88 and 89 are arranged to go overcenter to their stop position so that only momentary energization of solenoid 87 will be required. Opening of switch 91 as clutch 92 is opened will insure interruption of power to solenoid 87 as the film stop is completed, since RL8 will be de-energized.

Switches 88 and 89 will be closed by the motion of the stop mechanism. Switch 88 will provide a ground connection for the restart cycle (this cycle not being initiated until an answer has been selected by a student), and switch 89 will serve to energize the answering circuits by grounding wire 96 leading from RL1A.

RL1A is supplied with D.C. power from wire 85 to its pin 10. When pin 2 is grounded through wire 96 and switch 89, RL1A will be energized. Energization of RL1A will open its pins 5 and 6, breaking the latching circuit for RL10, and the latter will become de-energized.

Closure of pins 1 and 3 of RL10 will connect D.C. supply wire 74 to closed pins 11 and 9 of RL1A, applying power to the selector circuits starting at pin 1 of first selector relay RL3.

Energization of RL1A will also open its pins 1 and 4, opening the circuit of RL11 and de-energizing this relay. De-energization of RL11 will be delayed by a capacitor 97 across its coil. This will insure that RL10 is de-energized before pins 1 and 4 of RL11 close.

The power supplied to pin 1 of RL3 will be passed on to one and only one of the selective choice answer circuits (depending upon the positions of RL3 and second selector relay RL4) and connected to the appropriate push button and arm of answer lamp relay RL15. The positions of RL3 and RL4 will depend upon the conditions of the lower left and lower right corners of film frame 93. If the lower right corner of frame 93 is transparent, photocell C will be energized, causing thyratron 98 to fire and thus energizing RL4. If the lower left-hand corner of frame 93 is transparent, photocell D will cause firing of thyratron 99 and energization of RL3.

Let us say, for example, that RL3 is energized and RL4 is not. This will cause power to be applied from pin 1 of RL3 to pin 7 of push button No. 3 (the answer push buttons are henceforth referred to by their answer numbers rather than by the reference numerals 25 and 28 of FIGURE 1) and to switch arm No. 3 of RL15. If the student pushes button No. 3, the power will be fed through pins 7 and 8 of this push button, through normally closed pins 8 and 9 of button No. 4, and through the normally closed pins 5 and 6 of both bottoms Nos. 1 and 2 in series and wire 101 to RL14, the correct-incorrect relay. A capacitor 102 is connected across RL14 to furnish a slow drop-out characteristic.

If the student pushes any button other than No. 3 simultaneously with No. 3, the power circuit to RL14 will be broken by opening the normally closed contacts of the switch. If the student fails to push button No. 3, no contact is made with pin 7 of this button and thus no power will be supplied to RL14. Thus, if, and only if, the students has answered correctly by pushing No. 3 alone, will power be supplied to RL14.

Depression of any of the four push buttons will apply power from pin 1 of RL3 through a wire 103 and pin 1 of the depressed push button to answer punch relay RL6. This relay is provided with a slow-in quick-out circuit including a resistor 104 and a capacitor 105. When RL6 is energized, power will be supplied through its pins 8 and 6 to pin 8 of RL14. If RL14 has previously been energized because the correct push button was depressed, power will be applied through its pin 6 to correct punch power relay RL13. If the correct button has not been depressed, or if an incorrect button has been depressed, RL14 will not be energized, and power will flow through its pin 5 to incorrect punch power relay RL12. Thus, either correct punch solenoid 77 or incorrect punch solenoid 75 will be energized. Power will be maintained on the punch as long as a push button is depressed.

The punch action will close punch switch 76, energizing advance power relay RL7 and answer lamp relay RL15. Energization of the latter relay will close its arm No. 3, energizing a lamp 29 (hereinafter referred to as lamp No. 3) immediately above push button No. 3 on panel 14. The student will thus be informed of the correct answer after his score has been recorded. Since frame 93 is still being projected on screen 17, the student will be able to refer to the screen in order to read the correct answer to the multiple choice question, as long as a push button is still depressed.

Energization of RL7 will cock tape advance solenoid 78 and energize reset relay RL1B. RL1B will be temporarily prevented from resetting RL10 and RL11 by the absence of power at pin 5 of RL6, the latter being energized by virtue of the fact that a push button is still depressed.

When the push button or buttons are released, RL6 will be de-energized, providing power to its pin 5 and thus through wire 106 to pins 1 and 6 of RL1B to provide the reset action described below. At the same time, de-energization of RL6 will remove power from wire 107 leading to pin 8 of RL14 and thus from the energized punch power relay RL12 or RL13, thereby permitting the corresponding punch to be retracted. The punch return will break the ground connection through switch 76 of RL7 and de-energization of RL7 will disconnect power from tape advance solenoid 78, permitting spring 79 to advance the tape. Switch 84 will be momentarily closed by pawl and ratchet 53 as the tape advances, grounding the coil of restart relay RL9 and initiating the restart cycle described above. Opening of switch 76 as the punch returns will also break the ground connection for answer lamp relay RL15, extinguishing the illuminated lamp.

When the film start has been completed by engagement of clutch 92, switch 89 will be opened, breaking the ground circuit for selector power relay RL1A, and this relay will be de-energized, disconnecting the power supply to pin 1 of RL3. The resetting of RL10 and RL11 will differ from that previously described. The reset for RL10 must occur between the time RL6 is de-energized and the time RL1B is de-energized, since the former action closes the circuit to RL10 through pins 8 and 5 of RL6, and the latter action opens the circuit by disconnecting pins 1 and 6 of RL1B.

RL6 is de-energized when the push button is released by the student. RL1B is de-energized after the de-energization of RL6 has cause RL12 or RL13 to become de-energized, the corresponding punch solenoid 75 or 77 has been de-energized, permitting the punch to be retracted, and RL7 is subsequently de-energized by opening of switch 76.

The initial energization of RL10 will be from pin 6 of RL1B through wire 108. As RL10 is energized, its pins 1 and 6 will be connected, so that wire 74 will supply current through pins 4 and 1 of de-energized relay RL11 to RL10, latching in RL10.

When RL1A is de-energized after the projector clutch 92 has been engaged and switch 89 opened, the latching circuit for RL10 will be completed through pins 5 and 6 of RL1A, the circuit being as follows: From wire 74 through pins 1 and 6 of RL10, pins 5 and 6 of RL1A, to wire 108 and RL10.

Closure of pins 1 and 4 of RL1A as the latter is de-energized will close a circuit to RL11, energizing this relay. Resistor 109 and capacitor 97 will delay energization of RL11 so that the latching of RL10 will not be interrupted.

The film will thus continue to be projected with appropriate instruction being displayed until another test is called for which may be either of an unlimited time type or a limited time type. A limited time test will be initiated by the appearance on a series of frames 93 with transparent upper right-hand corners, a number of frames having such corners being chosen to provide the proper length of time during which the answer may be given by the student.

Photocell A will cause thyratron 111 to fire, energizing limited time test relay RL1. Closure of pins 1 and 3 of RL1 will apply power to pin 8 of RL3. This is used in cases where an identification code is being applied to the tape, as described below, but will not be used for the limited time test now to be described.

Closure of contacts 6 and 8 of RL1 will ground RL1A, and energization of RL1A will cause de-energization of RL10 and RL11 as described above, and will apply power to the answer selection circuits through pin 1 of RL3.

The selector relays RL3 and RL4 co-operate essentially in the manner described above with respect to the unlimited time test, except that only two choices will be available. This is because RL3 cannot be energized; if it were energized the power applied to its pin 8 would be connected directly to the correct-incorrect relay RL14, and only correct punches would be made. Thus, only button Nos. 1 and 2 can be used, and the limited time test will normally, although not necessarily, be of a true-false type. This test might be given verbally by an instructor appearing on the screen who asks the question, or could be given by a written question appearing on the screen.

Depressing any button will produce a correct or incorrect punch and illuminate a lamp adjacent the correct push button. If, for example button No. 1 is the "true" button, and button No. 2 is the "false" button, if the answer to the question is true, the lower right-hand corner of the series of frames during which the student must answer will remain dark, so that RL4 will remain de-energized. This will supply power to pin 7 of button No. 1, and if the student depresses this button, current will flow to pin 8 of button No. 1 through pins 8 and 9 of button No. 2, pins 6 and 5 of button Nos. 4 and 3 in that order and through wire 101 to correct-incorrect relay RL14, energizing this relay. When delayed action relay RL6 is energized, as described previously, a correct punch will result. Failure to energize RL14, either by failing to depress the "true" button (in which case pins 8 and 7 of button No. 1 will not be connected) or by depressing the "false" button or button Nos. 3 and 4 (in which case the circuit to RL14 will be broken) will result in an incorrect punch when RL6 is energized.

Release of the push button will advance the tape and energize RL10 as described above. Once RL10 is energized, the answer selector system will be disenabled since the circuit through pins 1 and 3 of RL10 will be broken and further pushing of a button will have no effect.

When the end of the section of film having a transparent upper right-hand corner in each frame has passed, RL1 and RL1A will be de-energized and the transfer of the latching circuit for RL10 made as described above. If no button has been pushed when the end of the coded section passes and RL1 and RL1A are de-energized, power will still be applied from pin 3 of de-energized relay RL10 to pin 11 of RL1A. This power will be transferred to pin 8 of RL1A and thence to pin 8 of RL14, from where it will pass through pin 5 of RL14 to incorrect punch power relay RL12, producing an incorrect punch. The motion picture film will then continue to be projected with additional instruction, unlimited time tests or limited time tests in any desired order.

Movement of the incorrect punch will close switch 76 energizing advance power relay RL7 to energize tape advance solenoid 78 and reset relay RL1B. Energization of RL1B will close the circuit to RL10, the latter being latched in its energized position by the two pins 5 and 6 of RL1A.

The fact that a push button may be held in a depressed position after the series of transparent upper right-hand frame corners has passed, will result in a correct or incorrect punch being marked, just as if the button had been released in time. Since answer lamp relay RL15 and advance power relay RL7 will have been energized by movement of the correct or incorrect punch and closure of switch 76, reset relay RL1B will have been energized. The end of the series of transparent upper right-hand frame corners will cause de-energization of RL1 and therefore of RL1A, cutting off power to pin 1 of RL3 and thus de-energizing RL6. This will complete the circuit to RL10, which will be energized in the usual manner despite the fact that a push button many still be depressed. Since the de-energization of RL14 will be delayed by capacitor 102, any current passing through pins 1 and 3 of RL10 and pins 11 and 8 of RL1A after the latter is de-energized (by de-energization of RL1) to pin 8 of RL14 (just before RL10 becomes energized) will have no effect other than that already created by depression of a push button.

At any point during running of the film, an identification code may be impressed on tape 22 by alternate series of correct and incorrect punch marks. To punch a series of incorrect code marks, it is necessary only to place short lengths of frames 93 in the film having transparent upper right-hand corners; this could be done in an instructional portion of the film without interfering in any way with the instructional projection. As the end of each short length of transparent upper right-hand corner frames passes through the projector without a button being depressed, it will impress an incorrect punch on the tape and advance the tape as described above.

If it is desired to impress a series of correct punch marks on the tape as part of the identification code, this may be accomplished by a predetermined number of short series of frames each of which has a transparent upper right-hand corner and a transparent lower left-hand corner. This will simultaneously energize RL1 and RL3, and power will be applied through pins 1 and 3 of RL1 and pins 8 and 6 of RL3 to RL14, connecting pins 8 and 6 of this relay. As the end of each short series of such frames passes through the projector (RL10 having been de-energized at the beginning of each series by energization of RL1A), the current passing through pins 1 and 3 of RL10 and pins 11 and 8 of RL1A will pass through pins 8 and 6 of RL14 to the correct punch power relay RL13.

As mentioned previously, alternate series of correct and incorrect punch marks may be used for identification purposes; for example, each series of punch marks could represent a single digit, and the number 351, for instance, could be applied to the tape by three correct punch marks followed by five incorrect punch marks and then succeeded by one correct punch mark.

The function and control of relay RL10 is important to the operation of the unit. Normally, during running of the film, RL10 will be energized, thus supplying power to its own latching circuit. RL10 will be de-energized by disconnection of the projector drive at the beginning of an unlimited time test, or at the beginning of a limited time test. De-energization at the beginning of an unlimited time test will supply power to the answer buttons through terminals 11 and 9 of selector power relay RL1A. If the test is of the unlimited time type RL10 will again be energized when the depressed push button is released, but before RL1A is de-energized by restarting of the projector. This will prevent an incorrect mark from being punched (this being desired only after a limited time test if no push button has been depressed) and will disconnect power to the answer buttons. During a limited time test, RL10 will be energized by depression and release of a push button, thus likewise cutting off power to the answer buttons and preventing the automatic punching of an incorrect mark. If the time limit of a limited time test expires without a push button being depressed, RL10 will remain de-energized long enough to cause an incorrect mark to be punched, and the latter action will automatically result in RL10 being re-energized. Thus, the normal energized position of RL10 is attained after either type of test. RL10 will also be returned to its energized position after an identification code sequence has been marked on the tape.

As mentioned previously, reversal of the film is possible at any point in order to review particular subject matter. However, when the film is again driven in a forward direction, shifting of switch 32 to the forward position will result in an incorrect mark being punched on the tape. This will indicate to the test evaluator that the student has reversed the film. If this provision were not made, it would be possible for a student to cheat in answering a series of questions, assuming that he was sure of the answer to one question and knew the total number of questions. In such a case, he could repeatedly rerun the section of the film carrying the question to which he knew the answer, depressing the correct push button each time until sufficient punch marks were recorded to correspond with the total number of questions. The film could then be stopped, and the tape would show only a series of correct punch marks, giving the impression that all questions had been answered correctly.

However, with the present arrangement, cheating in this manner would result in an alternate sequence of correct and incorrect punch marks, so that the student would have a score which was only 50% correct.

When switch 32 is moved from its forward toward its reverse position, RL17 will at first be de-energized, as will RL16. The current flowing through switch 38 to the intelligence circuit will also be interrupted, and RL10 and RL11 will be de-energized, since no current will be supplied through wires 71, 72, 73 and 74.

When switch 32 is closed in its reverse position, RL17 will be re-energized but RL16 will not. The contacts of RL16 will thus be in their motor reverse position, and the connection 61 to the sound exciter lamp will be de-energized. No current will be supplied to the intelligence circuit, and RL10 and RL11 will remain de-energized. After the film has been run backward a sufficient distance, the student will again shift switch 32, this time to its forward position. When this is done, an incorrect mark will be punched on the tape and RL10 and RL11 will be locked in, as described above with respect to starting of the film.

Rewind switch 37 is provided for convenience when rewinding film while standing in the back of the unit. When shifted, it will cause rewinding of the film but without illuminating the projector lamp or energizing the intelligence circuit.

Special standard switch 38, when in its open position, will de-energize the intelligence circuitry so that ordinary film may be run in the projector.

Figure 4:
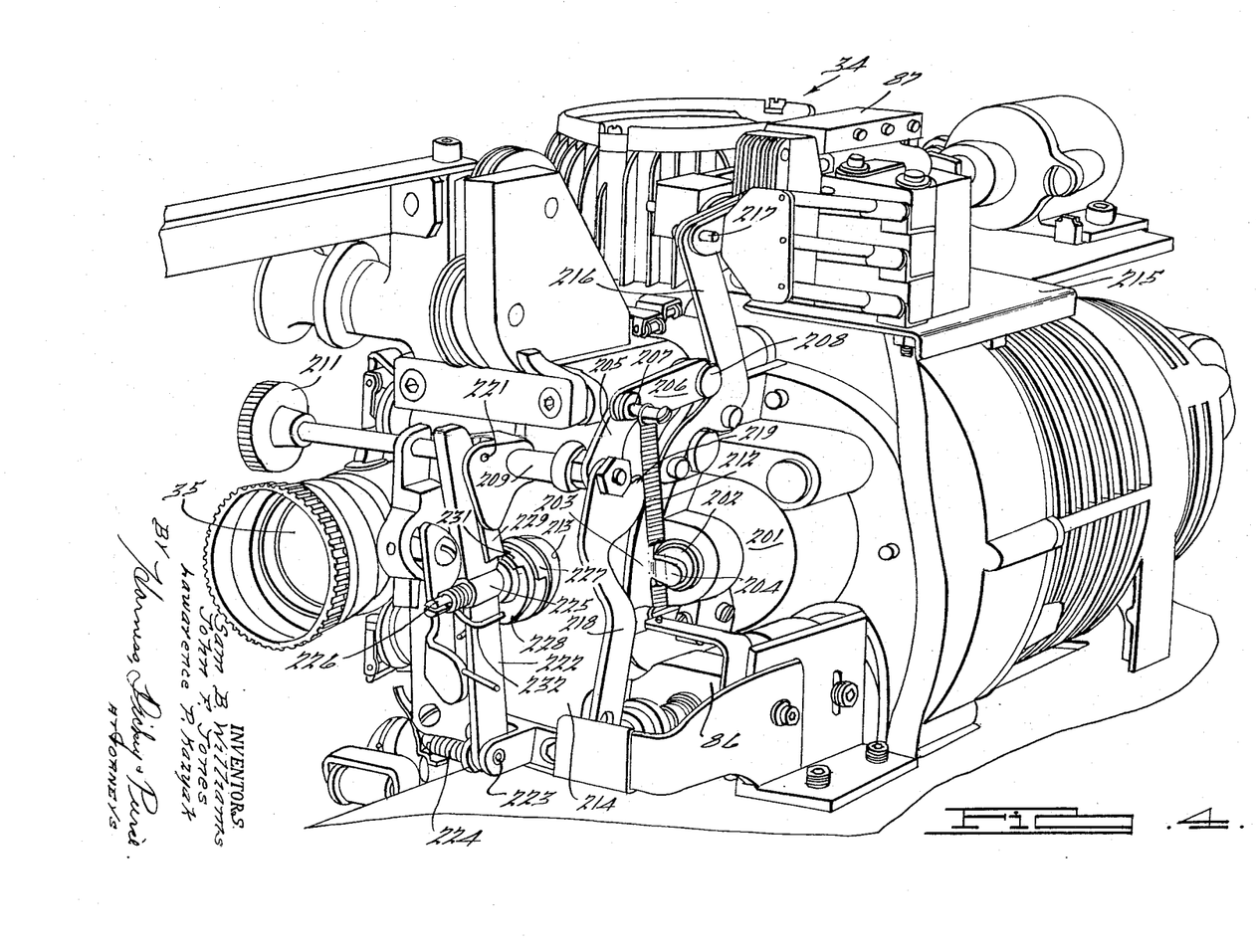
FIG. 4 is a perspective view of the forward portion of the projector showing the means for indexing the film to insure proper framing.

FIGURE 4 illustrates the components of a novel mechanism, forming part of the invention, which insures that the film will be stopped in the projector in such a position that a single frame is being fully projected. This mechanism is intended to co-operate with film drive clutch 92, the latter being a conventional clutch built into projector 34 and not seen in FIGURE 4, since it is enclosed within housing substructure 201. Clutch 92 is provided with a plunger 202 extending outwardly from housing 201, and conventionally a lever 203 is provided, this lever being pivoted to the housing as its lower end (not visible in FIGURE 4) and having a tab 204 extending across plunger 202. When lever 203 is swung clockwise in FIGURE 4 about its lower pivot, tab 204 will press plunger 202 inwardly, disengaging clutch 92.

A toggle mechanism comprising a pair of levers 205 and 206 is also conventionally provided on such projectors, the levers being connected by a pin 207, with lever 206 being pivoted at 208 to the top of lever 203 and lever 205 being fixed to a shaft 209 extending across the forward portion of the projector and rotatable by a knob 211. When knob 211 is rotated clockwise in FIGURE 4, it will straighten toggle links 205, 206, causing lever 203 to shift clockwise and disengaging clutch 92. A tension spring 212 holds the toggle linkage in its overcenter position with the clutch disengaged.

Another conventional feature mounted on such projectors is a shaft (not visible in FIGURE 4) extending forwardly from a recess 213 in a projector housing portion 214 adjacent lens 35, such shaft being directly connected to the film advance and shutter mechanism and being manually rotatable by a knob (removed for purposes of the invention) when the film is stopped so that the film may be shifted to properly align a single frame with respect to the lens. Ordinarily, this shaft may be set in any one of three positions 120° apart to achieve proper frame positioning. According to the invention, means are provided for interconnecting this frame adjusting mechanism with the actuating means for clutch 92 and for automatically setting the frame adjusting mechanism in proper position.

As seen in FIGURE 4, stop solenoid 87 is mounted on a platform 215 above the motor housing, and start solenoid 86 is mounted at the base of the projector. An extension 216 is secured to the upper end of lever 203 and is pivotally connected at 217 to the plunger of solenoid 87. A lever 218 is pivoted at its upper end to shaft 209 and is connected at its lower end to the plunger of start solenoid 86. Lever 218 is provided with a nose 219 engageable with toggle 205, 206 when the latter is in its overcenter position and lever 218 is swung counterclockwise, thus throwing the toggle back over center and releasing lever 203. A relatively strong spring (not shown) urges plunger 202 outwardly against lever 203 so that when the toggle is broken, clutch 92 will be re-engaged, and shaft 209 will be rotated counterclockwise.

A cam is secured to shaft 209, this cam comprising a pair of parallel spaced guides between which a pin 221 is secured, the pin acting as the cam. A lever 222 is pivoted at 223 to the lower portion of the projector and extends upwardly from, being disposed between the guide plates of cam 221 and being urged against the cam pin by a torsion spring 224 on pivot 223.

The central portion of lever 222 carries a bearing 225, and a shaft 226 is rotatably mounted in this bearing and extends toward the projector. This shaft is coaxial with the shaft (not shown) which extends from recess 213. A clutch member 227 is secured to this last-mentioned conventional film adjusting shaft, the clutch member being visible in FIGURE 4 and having three outwardly facing notches 120° apart. A second clutch member 228 is secured to the end of shaft 226 which faces clutch member 227. Clutch member 228 has three projections extending toward the notches in member 227 and interfittable therewith when lever 222 is shift clockwise in FIGURE 4. However, when lever 222 is shift counterclockwise, the two clutch members will be disengaged.

A leaf spring 229 is secured to lever 222 immediately above clutch member 228, this leaf spring projecting beyond the adjacent edge of lever 222. A projection 231 is provided on clutch member 228, this projection being engageable with spring 229. The arrangement of the parts is such that clutch member 228 may rotate in a clockwise direction as seen in FIGURE 4, but is stopped by leaf spring 229 when it is attempted to rotate clutch member 228 counterclockwise. A torsion spring 232 has one end secured to shaft 226 and the other end engageable with lever 222, this torsion spring urging shaft 226 and therefore clutch member 228 in counterclockwise direction so that projection 231 will engage spring 229.

In operation, when the projector is started by energization of starting solenoid 86, the parts will be in the position shown, with clutch members 227 and 228 disengaged. Clutch member 227 will rotate continuously since it is directly connected to the film drive mechanism.

When stop solenoid 87 is energized, plunger 202 will be depressed, disengaging clutch 92. The clockwise rocking of lever 203 about its lower pivot will draw the toggle linkage toward its overcenter position, into which it will be urged by spring 212. This movement will cause clockwise rotation of shaft 209, and withdrawal of cam pin 221 will permit lever 222 to shift clockwise, causing clutch member 228 to engage clutch member 227.

The three sets of teeth on these clutch members will become interfitted because of the continued rotation of clutch member 227, and the inertia of movement of the projector drive mechanism will cause temporary rotation of clutch member 228 against the action of spring 232. This movement will of course be reversed by spring 232, and both clutch members 228 and 227 will rotate counterclockwise until projection 231 engages leaf spring 229. The positions of the parts are so chosen that when in this final position the film will be properly adjusted with a single frame aligned with lens 35. The gradual stopping of the film drive mechanism will insure than no damage will result to the gears therein; sudden locking of the film drive mechanism could otherwise damage the parts.

When it is desired to restart the film, energization of solenoid 86 will cause toggles 205, 206 to be broken, and the spring which urges plunger 202 outwardly will cause the parts to return to their initial position.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a testing device, means for presenting a question to a student, a plurality of manually operable answer selection members accessible to the student, scoring means for registering a correct or incorrect answer by the student in response to the question, means forming part of said question presenting means for connecting said answer selection members to said scoring means for a predetermined period of time following the presentation of the question, and means including a portion of said question presenting means responsive to expiration of said predetermined time without the actuation of any of said answer selection members by said student for registering an incorrect answer on such scoring means.

2. In a testing unit, means for presenting first and second questions in sequence to a student, a plurality of answer selection members accessible to the student, scoring means for registering a correct or incorrect answer to the question, means responsive to presentation of the first question to the student for connecting said answer selection members to said scoring means without time limitation, means responsive to actuation of any of said answer selection members by the student for terminating said connection and presenting said second question to the student, and means responsive to presentation of said second question to the student for reconnecting said answer selection members to said scoring means for a predetermined and limited period of time.

3. The combination according to claim 2, further provided with means responsive to expiration of said predetermined time without actuation of an answer selection member by said student for registering an incorrect score.

4. In a testing unit, means for presenting first and second questions in sequence to a student, a plurality of answer selection members accessible to the student, scoring means for registering correct or incorrect selections of said answer selection members, means responsive to presentation of said first question to the student for connecting said answer selection members to said scoring means for a limited period of time, means including a portion of said question presenting means responsive to expiration of said limited period of time for presenting said second question to the student, and means responsive to presentation of said second question to the student for connecting said answer selection members to said scoring menas for an unlimited period of time.

5. The combination according to claim 4, further provided with means responsive to actuation of two or more of said answer selection members by the student in response to at least one of said questions for registering an incorrect response on said scoring means.

6. In a testing device, a plurality of answer selection members, scoring means for registering the selection of a correct or incorrect member by a student, means for presenting a series of questions in sequence to the student, first means forming part of said question presentation means for connecting said answer selection members to said scoring means, means responsive to actuation of an answer selection member by a student for disconnecting said answer selection members from said scoring means, and second means forming part of said question presentation means for connecting said answer selection members to said scoring means for a predetermined and limited period of time.

7. The combination according to claim 6, further provided with third means forming part of said question presentation means for registering an identifying code on said scoring means.

8. The combination according to claim 6 further provided with means responsive to actuation of any answer selection member by the student for indicating the correct answer to each question.

9. In an instructional testing device, a screen, means for projecting a motion picture film on said screen, a plurality of answer selection members accessible to a student viewing said film, scoring means for registering the selection of a correct or incorrect answer to a question presented to the student, and means including a portion of said film and elements responsive to passage of said film portion through said projecting means for predetermining the amount of time available to the student for answering a question presented by the film.

10. In an instructional and testing device, a control panel and an enclosure at the rear portion thereof, a projection screen at the forward end of said enclosure, means within said enclosure for projecting information on said screen and for presenting a series of questions to a student, answer selection members on said control panel, and scoring means comprising a tape within said enclosure, means for marking said tape in response to a correct or incorrect selection member by the student, means responsive to actuation of any answer selection member for advancing said tape, means on said control panel for rerunning a portion of said information and question presentation means, and means responsive to actuation of said rerunning means for causing a mark to be recorded on said tape.

11. The combination according to claim 10, further provided with means on said control panel for rerunning a portion of said information and question presentation means, and means responsive to actuation of said rerunning means for causing a mark to be recorded on said tape.

12. The combination according to claim 10, further provided with means for feeding the outer end of said tape outwardly of said enclosure.

13. The combination according to claim 10, further provided with means carried by said information and question presentation means for causing an identifying code to be recorded on said tape.

14. In combination, a desk having a writing surface, a control panel adjacent said writing surface, and an enclosure at the rear portion of the desk, a motion picture projector within said enclosure, a screen at the forward portion of said enclosure facing a student seated at the desk, means for projecting an image from said projector onto said screen, speaker means adjacent said screen, test scoring means comprising a tape roll, a plurality of answer selection buttons on said control panel, score marking means for marking said tape correct or incorrect in response to the actuation of an answer selection button, a film adapted to be fed through said projector and carrying a series of questions to be presented to the student, means carried by said film for causing said answer selection buttons and said score marking means to be interconnected in response to the presentation of each question to the student, and means responsive to each marking of the tape for advancing said tape.

15. The combination according to claim 14, further provided with a lamp on said control panel adjacent each answer selection button, and means responsive to actuation of any answer selection button by a student for illuminating the lamp adjacent the correct answer selection button.

16. The combination according to claim 14, further provided with means on said film for presenting a written question to the student, means carried by the film for stopping the projector when said written question is being projected on the screen, and means responsive to actuation of an answer selection button by the student for restarting the film.

17. In combination, means for presenting a question to a student, a plurality of answer selection members, scoring means for registering the correct or incorrect actuation of one of said answer selection members by a student, driving means for said question presentation means, means carried by said question presentation means for disenabling said driving means after a question has been presented, and means responsive to actuation of any answer selection member by the student for re-enabling said driving means.

18. The combination according to claim 17, further provided with means responsive to disenabling of said driving means for enabling said answer selection members and scoring means, and means for disenabling said answer selection members and scoring means when said driving means has been re-enabled.

19. The combination according to claim 17, said answer selection members comprising a plurality of push buttons, means responsive to depression of any push button for causing a score to be registered, and means responsive to release of said push button for re-enabling said driving means.

20. In combination, means for presenting a question to a student, a plurality of answer selection members, scoring means for registering the correct or incorrect actuation of one of said answer selection members by a student, driving means for said question presentation means, means carried by said question presentation means for disenabling said driving means after a question has been presented, means responsive to actuation of an answer selection member by the student for re-enabling said driving means, a test circuit cutoff relay movable between a first position supplying power to said answer selection members and scoring means and a second position cutting off such power, means responsive to disenabling of said driving means for moving said relay to its first position, and means responsive to registration of an answer on said scoring means for moving said relay to its second position.

21. The combination according to claim 20, further provided with means carried by said question presentation means for posing a question to the student while maintaining said driving means in its enabled position and simultaneously moving said test circuit cutoff relay to its first position for a predetermined period of time, and means responsive to the expiration of said predetermined time without actuation of any push button by the student for causing said scoring means to be marked incorrect and then moving said test circuit cut-off relay to its second position.

22. The combination according to claim 20, further provided with means responsive to release of said answer selection member by the student for holding said test circuit cut-off relay in its second position.

23. In combination, means for presenting a question to a student, a plurality of answer selection members, scoring means for registering the correct or incorrect actuation of one of said answer selection members by a student, driving means for said question presentation means, means carried by said question presentation means for disenabling said driving means after a question has been presented, said scoring means comprising a tape and means for causing correct or incorrect marks to be imposed on said tape, means for advancing said tape after each mark has been imposed thereon, and means responsive to advance of said tape for re-enabling said driving means.

24. The combination according to claim 23, said tape marking means comprising a correct punch and an incorrect punch, said answer selection members comprising a plurality of push buttons, one of said punches being movable to a punch position in response to depression of any push button, means for indicating the correct answer to a question, and means responsive to movement of said punch to its punch position for actuating said correct answer indicating means.

25. The combination according to claim 23, further provided with means responsive to actuation of one of said answer selection members in one direction for cocking said advancing means, and means responsive to release of said answer selection member for releasing said advancing means.

26. In combination, means for presenting a question to a student, a plurality of answer selection members, unitary for registering the correct or incorrect actuation of one of said answer selection members by a student, means responsive to the simultaneous actuation of two or more of said answer selection members for causing an incorrect mark to be registered on said scoring means, driving means for said question presentation means, means carried by said question presentation means for disenabling said driving means after a question has been presented, and means responsive to actuation of any answer selection member by the student for re-enabling said driving means.

27. In a testing device, means for posing a question to a student, a correct marking solenoid and an incorrect marking solenoid, a correct-incorrect relay shiftable between a normal first position enabling power to be supplied to said incorrect marking solenoid and a second position enabling power to be supplied to said correct marking solenoid, a plurality of answer selection members connected to said correct-incorrect relay, at least one selector relay, means synchronized with said question posing means for shifting said selector relay to supply power to certain answer selection members in accordance with the correct answer to the question, an answer marking relay shiftable to a position supplying power to one or the other of said answer marking solenoids through the switch of said correct-incorrect relay, and delayed-action means for shifting said answer marking relay to its said position in response to actuation of any of said answer selection members.

28. The combination according to claim 27, further provided with a selector power relay movable between a first position supplying power to said selector relay and a second position supplying power to said correct-incorrect relay switch, means synchronized with said question posing means for moving said selector power relay to its first position, and means responsive to the expiration of a predetermined time period after said selector power relay has been moved to its first position without actuation of any answer selection member by a student for moving the selector power relay to its second position whereby said incorrect marking solenoid will be energized.

29. In a testing device, means for posing a question to a student, a plurality of answer selection members, scoring means for registering a correct or an incorrect selection of one of said members in response to the question, a test circuit cut-off relay, means synchronized with said question posing means for moving said test circuit cut-off relay to a first position supplying power to said answer selection members and said scoring means when said question is posed, a selector power relay, means synchronized with said question posing means for moving the switch of said selector power relay to a first position in series with the switch of said test circuit cut-off relay when said question is posed, means synchronized with said question posing means for moving said selector power relay after a predetermined period of time to a second position causing the switch of said test circuit cut-off relay to be connected directly to said scoring means, whereby an incorrect score will be registered, and means responsive to actuation of any answer selection member before the expiration of said predetermined time for shifting said test circuit cut-off relay to a second position cutting off the power supply to said answer selection members and said scoring means.

30. In an instructional and testing device, a motion picture projector, a screen for receiving an image projected from the projector, a film carried by the projector, a plurality of answer selection buttons, scoring means for registering the correct or incorrect selection of one of said members by a student, a pair of photoelectric cells placed at spaced positions adjacent the edge of said screen for receiving light from portions of frames on said film, a pair of selector relays connecting said photoelectric cells to said answer selection members, a third photoelectric cell at another edge portion of said screen and adapted to receive light from a third portion of the film frames, driving means for said projector, and means connecting said third photoelectric cell to said driving means for disenabling said driving means.

31. The combination according to claim 30, further provided with a fourth photoelectric cell at a fourth edge portion of said screen and adapted to receive light from a fourth portion of the film frames, means connecting said fourth photoelectric cell to said scoring means for causing an incorrect mark to be registered thereon, and means actuatable by movement of any of said answer selection members for disenabling said last-mentioned means.

32. In combination, a motion picture projector, a film for said projector carrying a question to be posed to a student, an answer selection and marking circuit, means on said film for controlling said circuit in accordance with the proper answer to said question, means for driving said film in either a forward or a reverse direction, means responsive to driving of said film in the reverse direction for disenabling said answer selection and marking circuit, and means responsive to subsequent driving of said film in the forward direction for re-enabling said answer selection and marking circuit.

33. The combination according to claim 32, said answer and marking circuit including means for registering a correct or an incorrect answer to a question, and means responsive to initiation of forward drive of said film for causing an incorrect mark to be registered.

34. In an instructional and testing device having a motion picture projector with a lens and film drive, an answer selection circuit, means responsive to variations in portions of a film carried by said projector for controlling said answer selection circuit, means responsive to a variation on a portion of said film for disenabling said film drive, means responsive to said disenabling of the film drive for causing a single frame of said film to be centered with respect to the projector lens, a plurality of answer selection members, and means responsive to actuation of one of said answer selection members for re-enabling said film drive.

35. In an instructional and testing device having a motion picture projector with a lens and film drive, an answer selection circuit, means responsive to variations in portions of a film carried by said projector for controlling said answer selection circuit, means responsive to a variation on a portion of said film for disenabling said film drive, and means responsive to said disenabling of the film drive for causing a single frame of said film to be centered with respect to the projector lens.

36. In an instructional and testing device having a motion picture projector with a lens and film drive, an answer selection circuit, means responsive to variations in portions of a film carried by said projector for controlling said answer selection circuit, means responsive to a variation on a portion of said film for disenabling said film drive, means responsive to said disenabling of the film drive for causing a single frame of said film to be centered with respect to the projector lens, a plurality of answer selection buttons, means responsive to depression of any of said buttons for indicating the correct answer to the question, and means responsive to release of said push button for re-enabling said film drive.

37. The combination according to claim 36, further provided with a film for said projector carrying at least one frame with a plurality of multiple choice answers to a question, and means on said film for causing said disenabling of the film drive at a point which will cause said frame to be projected, said correct answer indicating means comprising a signal corresponding to the correct answer of said multiple choice answers.

References Cited by the Examiner

UNITED STATES PATENTS

| | | | |
|---|---|---|---|
| Re. 23,030 | 8/1948 | Holt | 35—9 |
| 2,158,644 | 5/1939 | Ward | 40—53 |
| 3,095,653 | 7/1963 | Corrigan | 35—9 |
| 3,100,351 | 8/1963 | Priednieks | 35—9 |
| 3,103,073 | 9/1963 | Nickl et al. | 35—9 |
| 3,120,708 | 2/1964 | Silber | 35—9 |
| 3,121,960 | 2/1964 | Uttal et al. | 35—9 |
| 3,123,920 | 3/1964 | Crowder et al. | 35—9 |
| 3,126,646 | 3/1964 | Penraat et al. | 35—9 |
| 3,141,243 | 7/1964 | Chapman et al. | 35—9 |

EUGENE R. CAPOZIO, *Primary Examiner.*

LAWRENCE CHARLES, *Examiner.*

S. M. BENDER, W. NIELSEN, *Assistant Examiners.*